Patented Dec. 15, 1936

2,064,728

UNITED STATES PATENT OFFICE 2,064,728

COLLOIDAL SULPHUR

William S. Calcott, Penns Grove, and Ira Williams, Woodstown, N. J., and Benton Dales, Wilmington, Del., assignors to E. I. du Pont de Nemours & Company, Wilmington, Del., a corporation of Delaware No Drawing. Application July 12, 1934, Serial No. 734,868. In Union of South Africa February 8, 1933

18 Claims. (Cl. 252—6)

The present invention relates to compositions of matter and more particularly to dispersoid sulphur, especially suspensoid sulphur sols, and a process for the preparation thereof.

This invention has for an object the production of new compositions of matter and new chemical and/or physical processes. Other objects are the preparation of colloidal sulphur, the preparation of colloidal sulphur in high concentrations, the rapid preparation of colloidal sulphur, the preparation of colloidal sulphur by means of emulsification, the preparation of colloidal sulphur by means of turbulent flow emulsification, the preparation of colloidal sulphur by means of colloid mill emulsification, the preparation of stable disperse systems, and the preparation of stable sulphur dispersoid sols. Other objects are the preparation of colloidal sulphur in commercial quantities and concentrations and, in general, an advancement of the art. Other objects will appear hereinafter.

These objects are accomplished by emulsifying molten, low viscosity sulphur in a liquid dispersion medium comprising a water-miscible organic liquid in which sulphur is substantially insoluble and preferably containing a protective material, and causing direct solidification of the dispersed sulphur in the emulsion.

The invention will be further understood from a consideration of the following examples, in which the quantities are stated in parts by weight.

Example I

One hundred (100) parts of a dispersion medium containing 10 parts of sodium caseinate and 90 parts of a water-glycerin mixture consisting of 90% glycerin and substantially 10% water, were heated to a temperature of 130° C. and agitated with a stirrer which was run at a speed of 4000 R. P. M. One hundred (100) parts of sulphur were heated to 130° C. and run into the glycerin composition while it was being stirred. The stirring was continued until the temperature had dropped to about 60° C. Thereafter, the resultant product was cooled and diluted with water. Upon examination of the diluted material, it was found that all of the sulphur was dispersed and in rapid Brownian motion.

A stirrer one inch in diameter has been found to produce satisfactory results where the total quantity of material (dispersion medium plus disperse system) is about 1 kilog. or less. With larger quantities of materials corresponding changes in the stirrer are desirable in order to produce corresponding states of agitation,

Example II

Ninety (90) parts of a water-glycerin mixture (consisting of 40% glycerin and about 60% water) and 10 parts of sodium caseinate were mixed together, and 100 parts of sulphur added. The whole mixture was heated to a temperature of about 120° C. to about 130° C. in a jacketed closed vessel provided with efficient agitation. The resultant mixture was then subjected to high-speed agitation with a stirrer operating at about 4000 R. P. M. The stirring was continued until the temperature had dropped to about 60° C. The resultant product was then rapidly cooled to room temperature. Upon examination, it was found that substantially all of the sulphur was in colloidal suspension in the form of small spherical particles which were in rapid Brownian motion.

After standing two weeks this product showed only very slight sulphur precipitation due to crystallization whereas a comparative product may by the emulsification of sulphur and water in a similar manner but without glycerin crystallized relatively rapidly.

Example III

Ten (10) parts of sodium caseinate and 90 parts of a water-glycerin mixture consisting of about 60% glycerin and about 40% water were heated with 100 parts of sulphur in a closed jacketed vessel to a temperature of about 130° C. and efficiently agitated with a stirrer run at a speed of about 4000 R. P. M. When emulsification was complete the resultant product was rapidly cooled. A stable colloidal sulphur suspension was obtained which exhibited no perceptible crystallization after two weeks.

Example IV

Thirty-one (31) parts of water, 73 parts of glycerin, 10.5 parts of ammonium caseinate, 2.5 parts of sodium isopropyl naphthalene sulphonate, and 2 parts of glue were placed in a closed jacketed vessel fitted with a high-speed agitator and heated to 125° C. One hundred (100) parts of melted sulphur were gradually introduced into the vessel with the agitator running. The stirring was continued for ten minutes after the sulphur had been added and the mass was then cooled as rapidly as possible with the stirrer running. The resultant product was a stable colloidal sulphur suspension.

According to procedures similar to those described in the examples, other colloidal sulphur dispersions may be prepared which are very stable and contain higher proportions of colloidal sulphur than heretofore obtainable in dispersions of such marked stability. Stable colloidal sulphur dispersions containing 40% to 50% or more of sulphur are readily produced by this method. The dispersions are essentially hydrophillic in nature.

The dispersion medium and the protective materials are chosen with respect to their properties towards each other and towards sulphur. Thus, the dispersion medium may be pure glycerin, but a water-glycerin medium is preferable because of its lower viscosity and the resultant greater ease of stirring and, also, because certain of the preferred types of protective materials (such as, for example, sodium caseinate) are soluble in water-glycerin mixtures but not very soluble in pure glycerin. Generally speaking, the dispersion medium should be such that the sulphur is substantially insoluble therein (that is, insoluble or very nearly insoluble) and the protective material should be soluble in the dispersion medium.

The invention is not limited to the particular protective materials set out in the examples. In general, any dispersing agent, wetting agent or protective colloid (generically referred to in this application as "protective material") which is stable under the conditions of operation may be used. The alkali metal caseinates are especially desirable since they are stable enough at the temperatures of operation and because of their excellence as dispersing agents. Their use leads to the production of colloidal sulphur dispersions in which the dispersion is alkaline. Insofar as is known, stable alkaline colloidal sulphur dispersions containing sulphur in commercial quantities have not heretofore been prepared. It is well known that the ordinary colloidal sulphur suspension is very sensitive to alkalis.

The term "protective" is herein employed in the sense of preventing coalescence of the dispersed material. It is realized that the terms relating to colloidal materials (for example, dispersion media, protective colloid, wetting agent, dispersing agent, and the like) are used very loosely in the art, and for this reason reference is made to the Chemical Age Dictionary (1924) as authority for the use of these terms in this application.

A water-miscible organic liquid such as glycerin, in which the sulphur is substantially insoluble, when used in sufficient amount has a stabilizing effect which is not apparent in other types of organic liquids such as, for example, diethylene glycol, that are miscible with water but dissolve sulphur at the temperature of emulsification. The term "stabilizing" is herein employed in the sense of retarding or preventing after-chemical effects on the sulphur, the protective material (e. g., the alkali metal caseinate), or both, which would result in the destruction of the dispersion with time. Thus, when molten sulphur is emulsified with water alone as the dispersion medium, the dispersed sulphur crystallizes in a relatively short time in spite of the presence of a protective agent such as an alkali metal caseinate, but when an organic liquid such as glycerin is present in sufficient amount, it retards or prevents this crystallization. For instance, in certain comparative tests a colloidal sulphur dispersion prepared by the emulsification of molten low-viscosity sulphur with water alone as the dispersion medium in the presence of sodium caseinate showed very marked sulphur crystallization after standing one month, whereas a dispersion prepared with a water-glycerin medium showed no perceptible crystallization after standing three months. With a dispersion medium containing about 60% glycerin and about 40% water, it has been possible in accordance with the present invention to prepare sulphur suspensions which have maintained their stability for at least a year. In general, while the proportions of glycerin are subject to some variation, it is preferable to employ a dispersion medium containing at least 40% and preferably not more than about 90% glycerin. Amounts of glycerin less than 40% certainly are of some stabilizing value, but the practical effect desired begins to appear at about this proportion of glycerin in the water-glycerin medium. Less than 10% glycerin in a water-glycerin medium has no appreciable effect. If desired, the dispersion may be made up in concentrated form from a dispersion medium containing relatively large amounts of glycerin and the resultant product then diluted with water to the desired water-glycerin ratio.

The temperature is so regulated during the emulsification process that the sulphur possesses low viscosity. When sulphur is melted, it passes through several states. The first state is a low viscosity state. This is followed by a thickening at a temperature above about 150° C. If the heating is continued, the sulphur becomes thin again (around 250° C. to 300° C.) and remains in this second low viscosity state to its boiling point (about 444° C.). For the application of the present invention the sulphur is preferably employed in its first low viscosity state. For this purpose, the temperature of the emulsification is preferably at least about 120° C. but not substantially greater than 135° C. Rapid heating is desirable.

The pressure should preferably be so regulated that boiling and evaporation of the dispersion medium does not occur. Super-atmospheric pressures may be employed. Ordinarily, the operation may be carried out satisfactorily in a closed jacketed vessel. The use of a glycerin-containing dispersion medium has the advantage (in addition to the stabilizing effect of the glycerin) that the composition of the dispersion medium may be so regulated that its boiling point is above the temperature of emulsification, and, hence, super-atmospheric pressures are not necessary to prevent boiling. Even in this case, however, operation under super-atmospheric pressure in a closed jacketed vessel is desirable to maintain a constant composition of the dispersion medium. The use of super-atmospheric pressures has the added advantage that it facilitates the discharge of the dispersion.

It is possible to reduce the melting point of the sulphur, for example, by dissolving it in a second material (e. g., naphthalene or dichlorobenzene). Mixed dispersions may be prepared by dispersing with the sulphur such substances as insoluble resins (for example, rosin), asphalts, chlorobenzenes and the like. The resultant dispersion system may comprise mixed particles or may consist of a solution of the added ingredient in the sulphur, dependent upon the particular material operated upon.

Various other materials may be added to the dispersion, for instance, preservatives to prevent the putrefaction of the alkali metal caseinate. Examples of such substances are water-soluble organic derivatives of cresylic acid.

The term "alkali metal" is employed throughout the specification and claims to cover not only the alkali metals, for example, sodium, potassium and the like (see Periodic table, Handbook of Chemistry and Physics, 12th Ed. pp. 474—475), but also the ammonium ($NH_4-$) radical.

The solidification of the sulphur from the emulsion may be obtained in any desired manner as, for example, natural or artificial cooling of the emulsion. Other things being equal, the more rapid the cooling, the finer and more stable the dispersion will be.

The emulsification process herein described may be carried out by means of apparatus other than a stirrer, as described in the specific examples. Mixtures of the molten sulphur, dispersion medium and protective material may be passed through suitable types of colloid mills with very desirable results.

The emulsification described herein has the advantage of being complete in a very short time, for instance from ten to sixty minutes, depending upon the exact conditions employed. High concentrations of colloidal material may be produced in very short times. Materials having all the sulphur in colloidal form are produced without practical difficulty even on a commercial scale. The stability of the resultant dispersions is particularly important from a commercial point of view since it is possible to prepare and store them some time before use. Furthermore, their stability is such that they may be marketed.

Throughout the specification and claims, by the term "emulsify" we mean the mixing together of two liquids so that one liquid becomes dispersed in the other. By the expression "emulsifying molten low-viscosity sulphur" it is intended to cover the mixing together of the liquid dispersion medium and the sulphur maintained in its molten low-viscosity state so that the resultant mixture is a dispersion of molten or liquid particles of sulphur in the liquid dispersion medium.

This application is a continuation-in-part of our co-pending U. S. application Serial No. 594,750 filed February 23, 1932.

As many apparently widely different embodiments of this invention may be made without departing from the spirit and scope thereof, it is to be understood that we do not limit ourselves to the specific embodiments thereof except as defined in the following claims.

We claim:

1. In a process of producing colloidal sulphur, the step which comprises emulsifying molten sulphur in its first state of low viscosity by rapid agitation with a water-glycerin mixture containing at least 60% glycerin.

2. In a process of producing colloidal sulphur, the step which comprises emulsifying molten sulphur at a temperature of about 120° C. to about 135° C. by rapid agitation with a water-glycerin mixture containing at least 40% glycerin and in the presence of an alkali metal caseinate.

3. A colloidal sulphur suspension comprising at least about 40% colloidal sulphur and at least about 40% glycerin.

4. A colloidal sulphur suspension comprising at least about 40% colloidal sulphur dispersed in a water-glycerin medium containing about 40% to about 90% glycerin based on the total amount of water and glycerin and also containing a protective material.

5. A colloidal sulphur suspension comprising at least 40% colloidal sulphur obtained by emulsifying and then rapidly cooling molten sulphur in its first state of low viscosity with a water-glycerin mixture and a protective material, the proportions of glycerin corresponding to at least 40% of the total amount of water and glycerin.

6. A colloidal sulphur suspension which is at least 40% colloidal sulphur obtained by emulsifying and then rapidly cooling molten sulphur in its first state of low viscosity with water, glycerin and an alkali metal caseinate, the proportions of glycerin being at least 40% of the total amount of water and glycerin.

7. A colloidal sulphur suspension comprising colloidal sulphur, water, glycerin and an alkali metal caseinate, the proportions of glycerin being greater than the proportions of water by weight but less than about 90% of the total amount of water and glycerin, and the amount of sulphur being about 40% to about 50% by weight of the dispersion.

8. A colloidal sulphur dispersion obtainable by emulsifying molten sulphur in its first state of low viscosity with a water-glycerin mixture containing about 40% to about 90% glycerin at a temperature of about 120° C. to about 135° C. in the presence of ammonium caseinate, glue and sodium-isopropyl-naphthalene-sulphonate, the amount of sulphur being about 40% to about 50% by weight of the dispersion, and rapidly cooling the emulsification product.

9. In a process of preparing colloidal sulphur, the step which comprises dispersing molten low viscosity sulphur by rapid agitation with a water-glycerin medium above the melting point of sulphur in the presence of a protective agent adapted to aid in dispersing and in preventing coalescence of the liquid sulphur particles, said medium containing at least 40% glycerin whereby upon direct cooling a colloidal sulphur suspension is directly obtained in which crystallization of the sulphur is materially retarded.

10. The process of preparing stable colloidal sulphur suspensions in which the sulphur particles are substantially spherical, uniform in size and exhibit rapid Brownian motion, which comprises rapidly heating a dispersion medium containing water, a major proportion of glycerin and an alkali metal caseinate to a temperature within the range of about 120° to about 135° C., subjecting said dispersion medium to rapid agitation with molten sulphur heated to its first state of low viscosity, and rapidly cooling the resultant mixture.

11. An alkaline colloidal sulphur suspension comprising at least 40% colloidal sulphur in the form of uniform spherical particles exhibiting rapid Brownian motion, dispersed in a medium containing water, an alkali and at least 40% glycerin.

12. An alkaline colloidal sulphur suspension containing at least 40% colloidal sulphur in the form of uniform spherical particles of such fineness that they are in rapid Brownian motion, dispersed in a medium containing water, an alkali and a major proportion of glycerin based upon the total amount of water and glycerin.

13. A colloidal sulphur suspension comprising the product obtained by emulsifying molten sulphur in its first state of low viscosity with water, glycerin and an alkali metal caseinate in such proportions that the amount of sulphur is at least 40% by weight of the total dispersion and the proportion of glycerin is 60% to 90% of the total amount of water and glycerin, and rapidly cooling the emulsification product.

14. In a process of producing colloidal sulphur, the step which comprises emulsifying molten sulphur per se by rapid agitation at a temperature from about 120° C. to about 130° C. under atmospheric pressure in a water-glycerin mixture which boils under atmospheric pressure at a temperature above 120° C.

15. In a process of producing colloidal sulphur, the steps which comprise rapidly agitating molten low viscosity sulphur at temperatures of about 120° to about 130° C. under pressures not greater than atmospheric in a liquid dispersion medium comprising water and a sufficient amount of a water-soluble polyhydric aliphatic alcohol containing at least three carbon atoms and at least three hydroxy groups so that the boiling point under atmospheric pressure is higher than the emulsification temperature, and then rapidly cooling.

16. The process of claim 15 in which the agitation is continued for a period varying from ten to sixty minutes.

17. The process of claim 15 in which the dispersion medium is a water-solution containing a sugar in sufficient amount to raise the boiling point above the emulsification temperature.

18. The process of claim 15 in which the dispersion medium is a water-glycerin mixture containing sufficient glycerin to raise the boiling point above the emulsification temperature.

WILLIAM S. CALCOTT.
IRA WILLIAMS.
BENTON DALES.

CERTIFICATE OF CORRECTION.

Patent No. 2,064,728. December 15, 1936

WILLIAM S. CALCOTT, ET AL.

It is hereby certified that error appears in the above numbered patent requiring correction as follows: In the heading to the printed specification, line 9-10, strike out the words "In Union of South Africa February 8, 1933"; and that the said Letters Patent should be read with this correction therein that the same may conform to the record of the case in the Patent Office.

Signed and sealed this 2nd day of March, A. D. 1937.

(Seal)

Henry Van Arsdale
Acting Commissioner of Patents.